US006856755B1

(12) United States Patent
Lin et al.

(10) Patent No.: US 6,856,755 B1
(45) Date of Patent: Feb. 15, 2005

(54) METHOD AND APPARATUS FOR EDITING IN A FORWARD OR REVERSE DIRECTION ON A REWRITEABLE DISC MEDIA

(75) Inventors: Shu Lin, Indianapolis, IN (US); Mark Alan Schultz, Carmel, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/606,897

(22) Filed: Jun. 29, 2000

Related U.S. Application Data

(60) Provisional application No. 60/164,793, filed on Nov. 10, 1999.

(51) Int. Cl.[7] .............................................. H04N 5/93
(52) U.S. Cl. ................................................ 386/52; 386/95
(58) Field of Search ................................ 386/4, 45, 46, 386/52, 55, 95, 124–126; 725/50.54; 269/47.13, 83, 32; 360/13

(56) References Cited

U.S. PATENT DOCUMENTS

| | | | | |
|---|---|---|---|---|
| 5,809,201 A | * | 9/1998 | Nagasawa | 386/126 X |
| 5,867,462 A | * | 2/1999 | Tholen et al. | 369/47.54 |
| 5,883,865 A | * | 3/1999 | Kondo et al. | 369/32 |
| 5,940,351 A | * | 8/1999 | Fujinami et al. | 369/47.54 X |
| 6,064,796 A | * | 5/2000 | Nakamura et al. | 386/95 |
| 6,072,934 A | * | 6/2000 | Abecassis | 386/46 |
| 6,081,495 A | * | 6/2000 | Saoyama et al. | 369/47.13 |
| 6,088,304 A | * | 7/2000 | Aramaki et al. | 369/32 |
| 6,167,189 A | * | 12/2000 | Taira et al. | 386/112 X |
| 6,198,877 B1 | * | 3/2001 | Kawamura et al. | 386/126 X |
| 6,209,130 B1 | * | 3/2001 | Rector et al. | 725/50 |
| 6,215,748 B1 | * | 4/2001 | Greenwood et al. | 369/53.31 |
| 6,269,216 B1 | * | 7/2001 | Abecassis | 386/46 |
| 6,282,320 B1 | * | 8/2001 | Hasegawa et al. | 382/233 |
| 6,288,989 B1 | * | 9/2001 | Ro et al. | 369/47.13 |
| 6,289,166 B1 | * | 9/2001 | Uno et al. | 386/46 |
| 6,445,873 B1 | * | 9/2002 | Noguchi et al. | 386/46 |

FOREIGN PATENT DOCUMENTS

| | | | | |
|---|---|---|---|---|
| EP | 0903744 A | * | 3/1999 | |
| EP | 0929072 A | * | 7/1999 | |
| EP | 1021048 A | * | 7/2000 | |
| EP | 1049097 A | * | 11/2000 | |
| WO | WO9706531 A | * | 2/1997 | |
| WO | WO9938166 A | * | 7/1999 | |
| WO | WO002195 A | * | 1/2000 | |
| WO | WO0014743 A | * | 3/2000 | |

* cited by examiner

*Primary Examiner*—Thai Tran
*Assistant Examiner*—Christopher Onuaku
(74) *Attorney, Agent, or Firm*—Joseph S. Tripoli; Harvey D. Fried; Christine Johnson

(57) ABSTRACT

Method and apparatus for editing a recorded series of bits on a rewritable disc media. The method includes the steps of selectively identifying a beginning point and an end point of a segment of the recorded series of bits to be deleted; and modifying a first jump command in a control data portion of the disc. The first jump command is modified for causing playback from the disc to continue at the end point when reading in a forward direction. The method can further include modifying a second jump command in a control date portion of the disc for causing playback from the disc to continue at the beginning point when reading data for playback in a reverse direction.

8 Claims, 5 Drawing Sheets

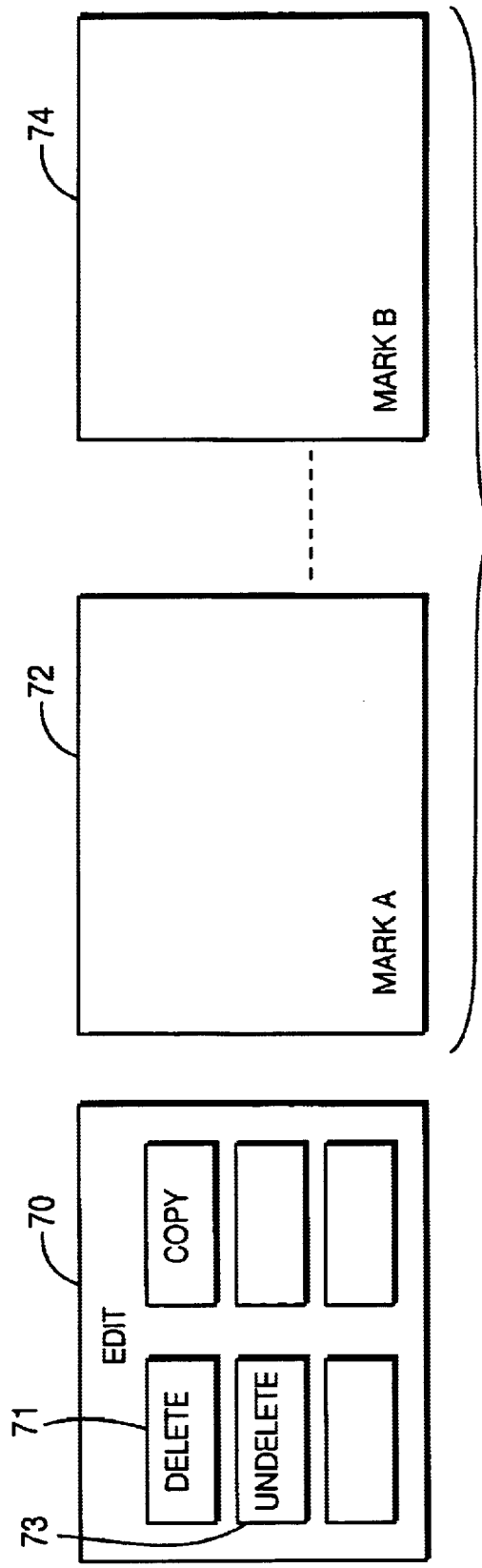
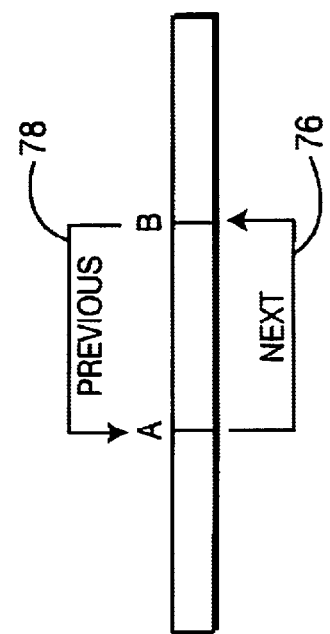
FIG. 4a
FIG. 4b
FIG. 4c
FIG. 4d

METHOD AND APPARATUS FOR EDITING IN A FORWARD OR REVERSE DIRECTION ON A REWRITEABLE DISC MEDIA

CROSS REFERENCE TO RELATED APPLICATIONS

This is a continuation of U.S. Provisional Application 60/164,793 filed on Nov. 10, 1999 entitled RECORD/PLAY/EDIT FEATURES FOR REWRITABLE DISK MEDIA.

BACKGROUND OF THE INVENTION

Technical Field

The inventive arrangements relate generally to methods and apparatus providing advanced operating features for audio only, video only and both video and audio programs recorded on disc media, for example recordable digital video discs, hard drives and magneto optical discs.

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

Depending upon the standard that is eventually adopted, if any, certain recording schemes used to implement various advanced features will be compatible with all devices adhering to the standard, whereas other recording schemes may prove to be incompatible due to inconsistencies with the standard. Nevertheless, a particular proprietary advanced feature incompatible with other devices can still be very desirable from a consumer's point of view. The result is merely that a recording made in accordance with an incompatible advanced feature cannot be played back on the device of a different manufacturer, even if conventional recordings are fully compatible and portable.

In many cases, the program presentations are recorded in the viewer and/or listener's absence, for presentation at a later, more convenient time. This is referred to as time shifting the program. At other times, a program is being viewed and/or listened to without being recorded, and with out any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales. DVD machines typically have a 1× read and 1× write capability. Such devices can typically have maximum data rates for recording or playing back of approximately 11 megabits/second. Thus, a key consideration for implementing delete and undelete functions for the purposes of the present invention is the relatively slow rate for reading and especially recording data on a DVD. This slow rate is attributable in large part to the nature of the mechanical assembly of conventional DVD devices and the limitations associated with reading and especially writing data to an optical disc. Thus, conventional means for implementing copy, delete and undelete functions on a recordable magnetic media may not be suitable for DVD.

Rewritable DVD technology typically uses MPEG-2 encoders and decoders and many acronyms are encountered that are related to MPEG-2. The DVD standard, for example, calls for the video content of the disc to be divided up into video object units (VOBUs) in which each VOBU typically contains 0.4 to 1.0 seconds of presentation material. Each VOBU starts off with a navigation pack (NV_PCK or NAV_PACK). The navigation pack contains a lot of navigation information, some of which is very useful for trick modes. As used herein, trick modes refer to any operational mode for a recordable disc media other than the standard play mode. Thus, such modes can include reverse, fast forward, pause mode and so on.

The navigation pack includes presentation control information (PCI) and data search information (DSI). One example is the inclusion of the start addresses for many of the nearby VOBUs. This can facilitate jumping to the next VOBU forward or backward, or for a faster trick mode, to the second VOBU forward or backward, or to the third, etc. Another example is the inclusion of the end address for the first three reference pictures in the VOBU. This is the only clue given as to the structure of the VOBU.

Each video object set (VOBS) includes a plurality of video objects. Each video object includes a plurality of cells. Each cell includes a plurality of VOBUs. Each of the VOBUs containing the video content of the disc typically contains 0.4 to 1.0 seconds of presentation material. A typical VOBU in a commercial movie contains 0.5 second of presentation material, corresponding to one group of pictures (GOP). Each VOBU is a sequence of packs in recording order. Each VOBU starts with exactly one navigation pack and encompasses all of following kinds of packs, including a video pack (V_PCK), an audio pack (A_PCK) and a sub-picture pack (SP_PCK).

Data search information (DSI) helps the decoder to find reference pictures within the VOBU corresponding to the current Nav_Pack. DSI also helps the decoder to find VOBUs far into the future or past of presentation data, relative to the current VOBU. The VOBUs in the past relative to the current VOBU presentation are referenced in fields of the Nav_Pack known as the BWDI (backward information). The VOBUs in the future relative to the current VOBU presentation are referenced in fields of the Nav_Pack known as FWDI (forward information). One example is the inclusion of the start addresses for many of the nearby VOBUs, up to +240 VOBU forward and −240 VOBU backward directions. This can facilitate jumping to the next VOBU forward or backward, or for a faster trick mode, to the second VOBU forward or backward, or to the third, etc. The video, audio, subpicture, presentation control information and data search information are the five components of the DVD bit stream.

SUMMARY OF THE INVENTION

The invention concerns a method for editing a recorded series of bits on a rewritable disc media. The method includes the steps of selectively identifying a beginning point and an end point of a segment of the recorded series of bits to be deleted; and modifying a first jump command in a control data portion of the disc. The first jump command is modified for causing playback from the disc to continue at the end point when reading in a forward direction. The method can further include modifying a second jump command in a control data portion of the disc for causing playback from the disc to continue at the beginning point when reading data for playback in a reverse direction.

According to one aspect of the invention, the recorded series of bits are grouped into cells. The method further includes dividing a cell into two cells when the beginning point and the end point are each contained within the cell. In that case a first one of the cells is assigned an end address at the beginning point of the segment and a second one of the cells is assigned a starting address at the end point of the segment.

According to another aspect, the method can also include changing an existing start address of the cell to an address of the end point when the beginning point is the start address. Alternatively, the method can include changing an existing end address of the cell to an address of the beginning point when the end point is the end address of the cell.

The method can further include changing an end address of a cell containing the beginning point to an address of the beginning point when the segment extends between a plurality of cells. In that case, the method can also include the step of changing a start address of a cell containing the end point to an address of the end point.

According to another aspect wherein the recorded series of bits are grouped into cells, the invention can further include the step of automatically modifying status information concerning the cells contained within a control data area of the disc. For example, this step can include setting an access restriction flag of each cell contained within the segment to prevent access to the cells during playback of the series of bits. According to yet another aspect of the invention, the method can further include the step of maintaining a delete table to identify the segment which has been deleted as available space on the disc.

In an alternative embodiment, the invention can include an apparatus for editing a recorded series of bits on a rewritable disc media. The apparatus include disc read/write circuitry and a microprocessor controller with suitable programming for selectively identifying a beginning point and an end point of a segment of the recorded series of bits to be deleted; and for modifying a first jump command in a control data portion of the disc for causing playback from the disc to continue at the end point when reading in a forward direction. The apparatus can also include circuitry and processing facilities for modifying a second jump command in a control data portion of the disc for causing playback from the disc to continue at the beginning point when reading for playback in a reverse direction.

According to one aspect, the recorded series of bits are grouped into cells and the apparatus further includes circuitry and processing facilities for dividing a cell into two cells when the beginning point and the end point are each contained within the cell. In that case a first one of the cells is assigned an end address at the beginning point of the segment and a second one of the cells is assigned a starting address at the end point of the segment.

The apparatus can also include circuitry and processing capabilities for changing an existing start address of the cell to an address of the end point when the beginning point is the start address, or for changing an existing end address of the cell to an address of the beginning point when the end point is the end address of the cell.

According to yet another aspect, the apparatus can include circuitry and processing capabilities for changing an end address of a cell containing the beginning point to an address of the beginning point when the segment extends between a plurality of cells. In that case, the invention can also include circuitry and processing capabilities for changing a start address of a cell containing the end point to an address of the end point.

According to one embodiment, the recorded series of bits are grouped into cells and the invention can further include circuitry and processing capabilities for automatically modifying status information concerning the cells in a control data area of the disc. For example, the system can set an access restriction flag of each cell contained within the segment to prevent access to the cells during playback of the series of bits. Finally, the invention can also include circuitry and processing capabilities for maintaining a delete table to identify the segment which has been deleted as available space on the disc.

BRIEF DESCRIPTION OF THE DRAWINGS

FIGS. 4(a) through 4(d) are useful for explaining edit features, such as DELETE and UNDELETE in accordance with the inventive arrangements.

DETAILED DESCRIPTION OF THE PREFERRED EMBODIMENTS

Recordable DVD Device

Figure 1:
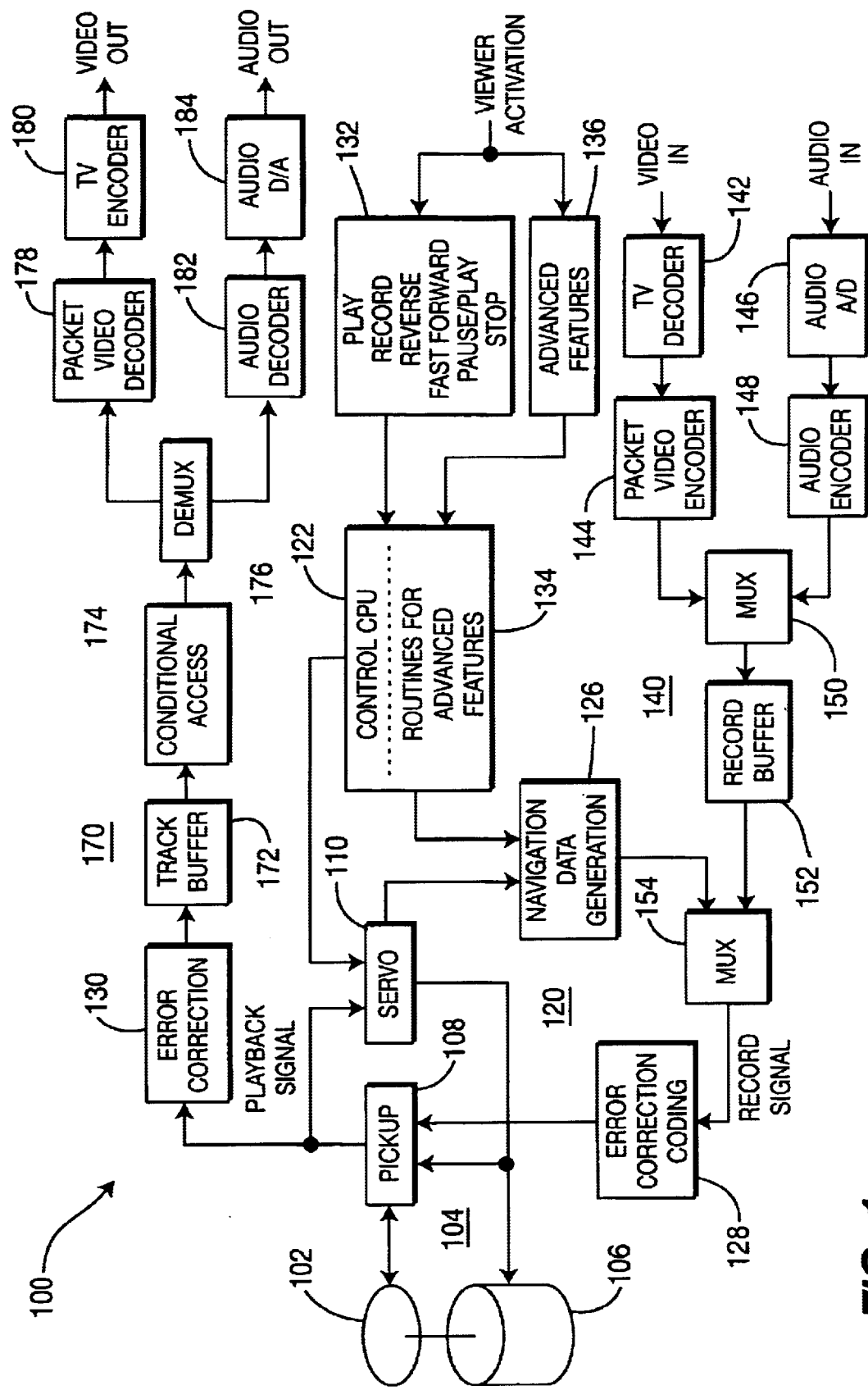
FIG. 1 is a block diagram of a rewritable DVD device that can be provided with one or more advanced operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disc 102 by the laser.

A control buffer 132 for viewer activatable functions indicates those functions presently available, namely play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

As a practical matter, the smallest addressable unit on the spiral track of a DVD is an ECC (error correction code) block of 16 sectors, where each sector includes 2048 bytes of user data. A group is an integer number of EEC blocks, for example 12. Each group of blocks represents approximately 0.5 seconds of combined video and audio program material. The amount of linear space along the spiral track needed to record a group of EEC blocks, for example 192 sectors, is defined herein as a segment of the spiral track. Accordingly, it can appear that the record buffer needs to be only large enough to store one segment of data. One segment of data can correspond, for example, to approximately 0.5 seconds of audio and video program material.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing. Accordingly, it can also appear that the track buffer 172 needs to be only large enough to store one segment of data, also corresponding to approximately 0.5 seconds of audio and video program material.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. The output processing path 170 can be deemed to include the error correction circuit 130, as noted.

DVD Media

Figure 2:
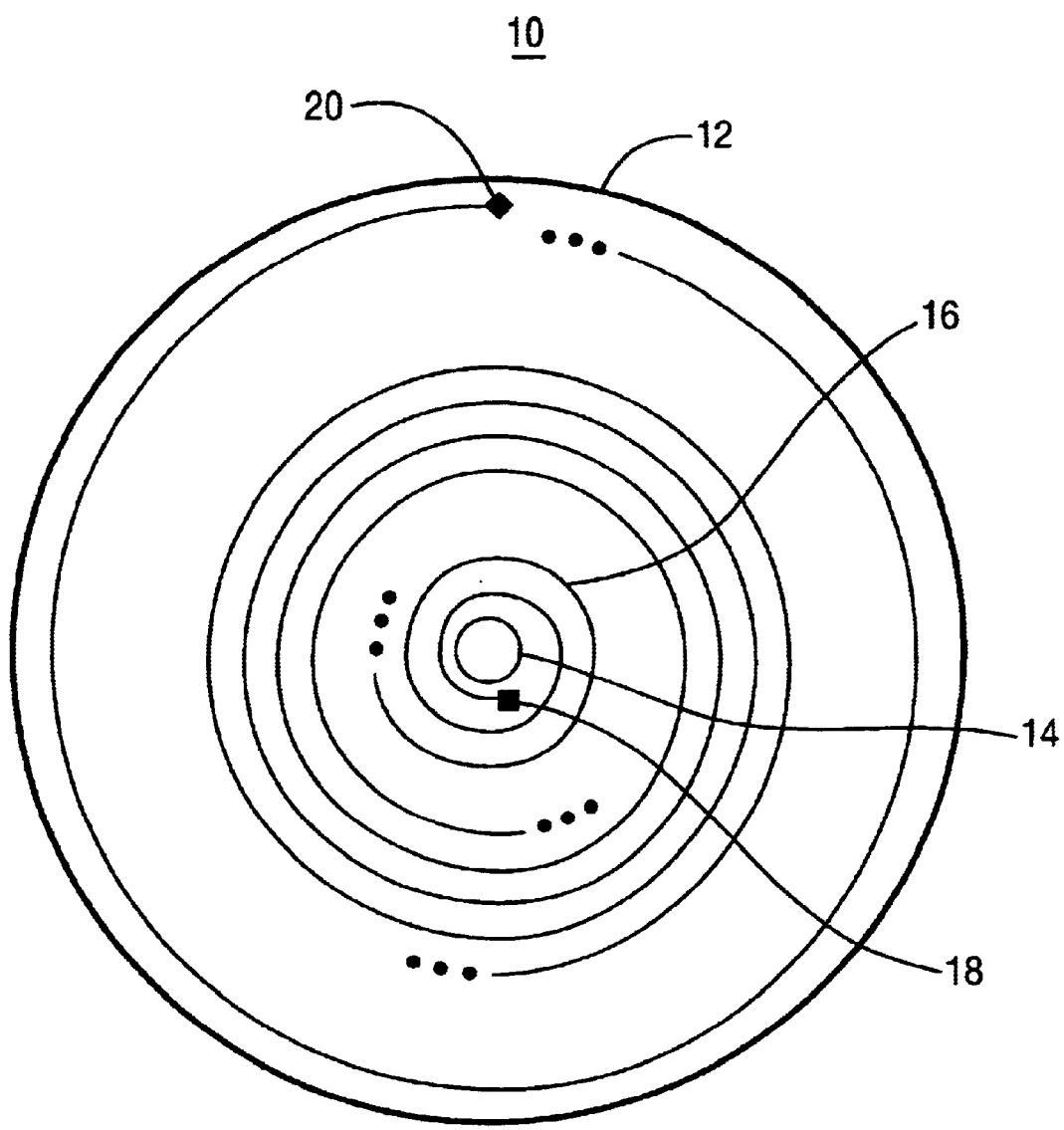
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 if formed by a flat, round plastic plate-like member 12 having a hole 14 in the middle. The direction of recording on the track is typically outwardly along a spiral track 16, from a smaller radius part of the spiral to a larger radius part of the spiral. The several series of three large dots {• • •} denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. Certain advance features in accordance with the inventive arrangements utilize backward recording, that is, from a larger radius part of the spiral to a smaller radius part of the spiral. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

It is often necessary to jump back one revolution of the track during operation due to the rotational speed of the disc medium being higher than needed. This is a common technique understood by those skilled in the art.

Figure 3:
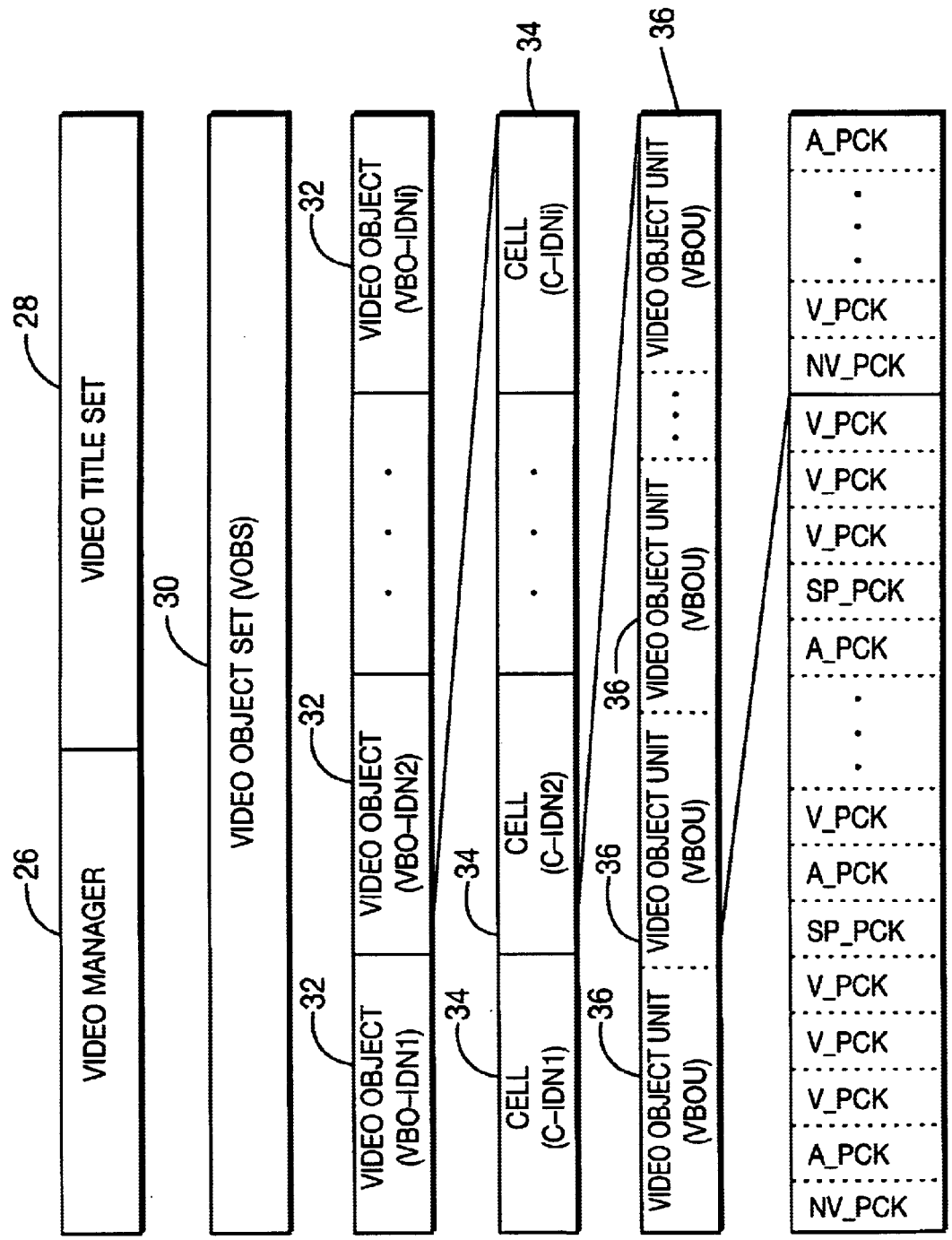
FIG. 3 is a diagram useful for explaining the organization of video disc.

As shown in FIG. 3, each DVD contains a video manager 26 and video title set information (VTSI) within the video title set 28. It also includes a plurality of video object set (VOBS) 30 comprised of a plurality of video objects 32. Each video object 32 includes a plurality of cells 34. Each cell includes a plurality of VOBUs 36. Each of the VOBUs 36 in which the video content of the disc resides typically contains 0.4 to 1.0 seconds of presentation material. Each VOBU 36 is a sequence of packs 38 in recording order. Each VOBU starts with exactly one navigation pack and could encompass all of following kinds of packs, including video packs (V_PCK), audio packs (A_PCK) and sub-picture packs (SP_PCK).

The VTSI 28 contains control data including the start and end addresses for all cells 34 and video object units 36. The VTSI can also includes jump commands where appropriate for moving from one VOBU to another, or from one cell to another. Those skilled in the art will be familiar with such jump commands as they are defined in the DVD specification. The jump command ensure continuity of program playback and direct the reading of data at various locations on the disc.

Various modifications of the device illustrated in FIG. 1 and the disc medium illustrated in FIG. 2 can be used together to implement the advanced features taught herein in accordance with the inventive arrangements. It will be appreciated that the advanced features taught herein are applicable to other kinds of disc media and disc media players and recorders.

A valid DVD program stream is segmented into presentation units known as VOBUs. Each VOBU is punctuated by its first pack being a navigation pack (Nav_Pack), and the remaining packs consist of associated video, audio, and user presentation data packs. The Nav_Pack contains presentation control information as well as data search information. The data search information is useful in performing "trick" modes of playback, that is, modes in which some subset of the total pictures are presented in order to achieve a faster presentation of the material. One aspect of data search information (DSI) is that it helps the decoder to find reference pictures within the VOBU corresponding to the current Nav_Pack. Another aspect of the DSI is that it helps the decoder to find VOBUs far into the future or past of presentation, relative to the current VOBU. The VOBUs in the past relative to the current VOBU presentation are referenced in fields of the Nav_Pack known as the BWDI (backward information). The VOBUs in the future relative to the current VOBU presentation are referenced in fields of the Nav_Pack known as FWDI (forward information).

Copy, Delete and Undelete for Recordable DVD Editing

Recordable DVD has to have some editing features in order to let the consumer make their own home videos, such as wedding, birthday party, etc. Even after recording a TV program, a consumer can wish to erase commercials from certain programs, for example sports events and movies. In other instances, consumers may wish to copy portions of recorded video for use in different video presentations. In this regard, three edit functions, namely DELETE, UNDELETE and COPY are provided in accordance with the inventive arrangements for a DVD recorder. DELETE is used to delete a segment. UNDELETE is used to undo a delete. COPY is used to copy a segment either within a disc or from a disc to another disc. These functions provide the ability to edit a bit stream on a recordable DVD disc.

An EDIT button can be provided on a remote control device. When the button EDIT is pressed, a screen 70 can be displayed with EDIT as a title and some or all the editing functions, such as DELETE, COPY, UNDELETE, etc. as shown in FIG. 4(*a*).

According to one embodiment, if DELETE button 71 is selected, it becomes highlighted and the user is requested to enter a mark 72, 74 at the beginning and at the end of the segment that will be deleted, as shown in FIG. 4(*b*). Marking can be accomplished by any suitable method which provides a reliable and accurate indication of the location where the segment begins and ends. According to a preferred embodiment, marking can be accomplished by storing in a memory location associated with control CPU 122 a disc sector number or an address identifying the beginning of a VOBU 36. However, the precise mode of marking is not critical and any other suitable method can be selected for this purpose. Trick mode can be used to allow the user to scan the program for marking the beginning and end points.

FIG. 4(*d*) is a representation of a bit stream showing a segment AB which LS has been marked by a user to be deleted. After the segment is marked, a screen (not shown) can be displayed to enable confirmation of the edit. If the edit is confirmed, the VTSI 28 will be modified for controlling the program playback. One command is a forward jump 76 and the other is backward jump 78, as shown in FIG. 4(*d*). Standard DVD disc navigation commands can be used in the VTSI for the jump forward and jump backward command. These commands are defined within the DVD specification.

After modifying the jump commands as described herein, each time point A is reached from forward or when the disc is being read in the forward direction, the modified VTSI control information 28 causes the DVD player to jump from A to B. In other words, the DVD player stop playback at point A and continues reading from point B. Conversely, when point B is reached from backward, i.e. when the disc is being read in a backward direction, the modified VTSI control information 28 causes the DVD player to jump from B to A.

Figure 5:
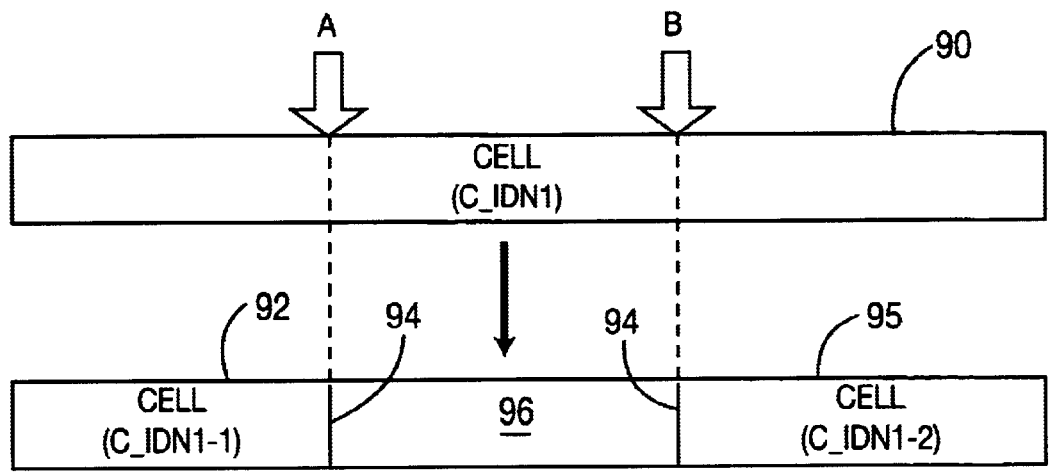
FIGS. 5-7 are cell diagrams useful for explaining edit features in accordance with the inventive arrangements.
Figure 6:
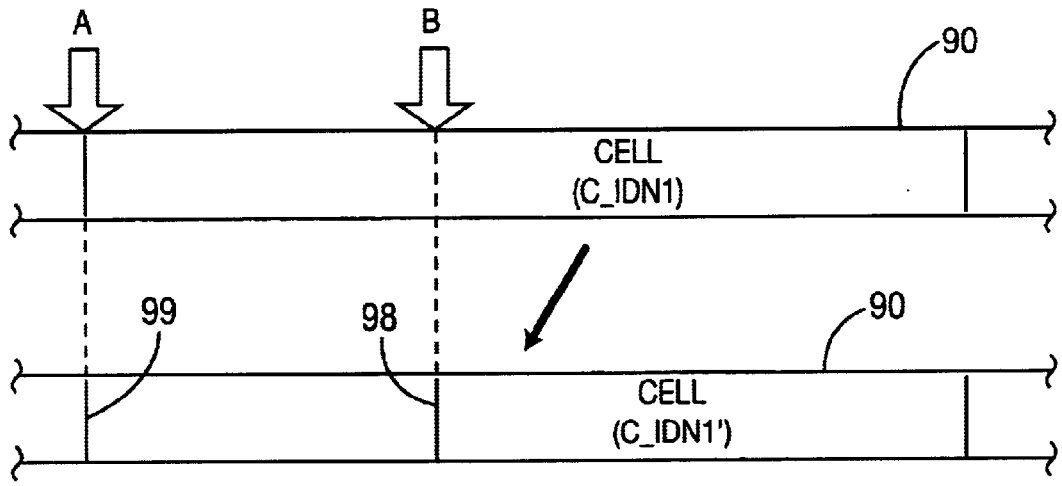

Referring to FIG. 5, if the segment defined by points A and B is part of a cell 90, then the cell will be divided into two cells. The result will be two cells 92, 94 in which the first cell 92 ends at the beginning point A of the segment, and the second cell 95 starts at the ending point B of the segment. Notably, the VOBUs forming the deleted segment 96 are not erased or destroyed. Instead, they remain in the bit stream but are merely not played back as a result of the modified VTSI 28. The DVD player now jumps from 93 to 94 when playing in a forward direction, and from 94 to 93 when playing backwards.

Where the segment defined by points A and B is part of a cell 90, there is a special case shown in FIG. 6 where A is an existing start point of a cell. In that case, the start address of the cell is changed to point B at 98 in VTSI 28. Any data referring to the start address of the cell is also changed for consistency. The existing jump command directing the DVD player to the beginning of cell 90 will now cause playback to begin at point 98 rather than point 99. Similarly, if B is the end point of a cell, then the end address of the cell 90 is changed to A in VTSI 28. Any data referring to the end address is also changed to A for consistency. The existing jump command directing the DVD player to the end of cell 90 will now cause playback to begin at point A instead.

Figure 7:
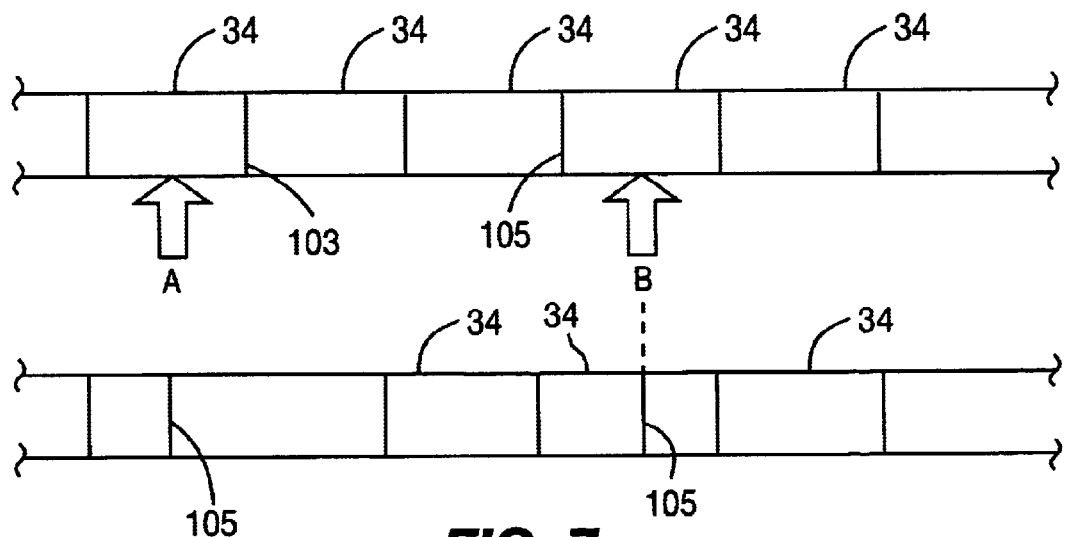

Referring now to FIG. 7, a plurality of cells 34 are shown. If segment AB extends across a cell boundary as shown, then the VTSI 28 is modified so that the end address 103 of the cell that contains point A is changed to A. Similarly, the start address 105 of the cell 34 that contains point B is changed to B in the VTSI. Any cells between point A and point B will no longer be played when the disc is played back in either the forward or reverse direction.

The cell information for cells within the deleted segment should be altered in the control data area in order to keep track of areas which are subsequently available for receiving data. The control data can include video manager information (VMGI) contained in video manager 26 and/or video title set information in video title set 28. One possible way to alter the cell information is by setting the Access Restriction Flag of each cell between A and B, and these cells will not be accessible during playback. The space of the deleted segment can then be put on an available space list if it is confirmed to be deleted forever. Some segments may be temporarily deleted and would therefore not be included on the available space list.

A DELETE Table 80 can be used in accordance with the inventive arrangements to perform the UNDELETE function. According to a preferred embodiment, the deleted segment information can be stored in memory in a DELETE Table as shown in FIG. 4(c). The DELETE Table can include a segment identification name 82, a deleted segment start address 84 and a deleted segment end address 86. An UNDELETE operation can be performed using this table 80 if the deleted segment has not already been overwritten. First, the DELETE table 80 is displayed in response to a user command. Then, one deleted segment is chosen by a user, and if desired, viewed. An UNDELETE button 73 can be activated to un-erase or un-delete the segment. Upon activating the UNDELETE button 73, the jump commands 76 and 78 are removed from the bit streams and any Access Restriction Flags are un-set.

If a deleted segment has been overwritten, the entry of this deleted segment is erased from the DELETE Table 80 as that particular segment can no longer be undeleted. If only a part of the segment is overwritten, the remaining portion of the segment can stay in the DELETE Table 80 if the size of the remaining part is sufficiently large so that it is non-trivial.

Deleting a small number of VOBUs, for example less than ten, need not necessarily require creating new cells and modifying jump commands as disclosed herein. Instead, the DVD player can change the contents of the pack to avoid using these packs during playback. For example, the PES packet lengths for these cells can be set zero. However, simply avoiding or skipping these packs can cause a non-seamless playback if too many VOBUs are skipped.

We claim:

1. A method for editing a portion of a program recorded on a digital storage medium comprising the steps of:

providing at least one user-selectable program editing command;

defining a portion of said recorded program to be edited by providing a portion start address corresponding to a first location on said storage medium and providing a portion end address corresponding to a second location on said storage medium;

upon user selection of at least one user-selectable program editing command, modifying at least one address of Video Title Set Information (VTSI) for said recorded program based upon at least said first location on said disk;

controlling playback of said program in accordance with the modified VTSI to carry out the user-selected editing command.

2. The method of claim 1 wherein said user-selectable program editing commands are provided via a menu and are displayed to the user on a display means.

3. The method of claim 1 wherein said user selectable editing commands are selected from the group comprising: edit, delete, undelete, copy.

4. The method of claim 1 wherein said portion start and end addresses are selected from the group comprising: a VOBU start address, and a disc sector number.

5. The method of claim 1 wherein the step of modifying Video Title Set Information (VTSI) comprises a step of modifying at least one cell start address based upon said location.

6. The method of claim 1 further comprising the steps of, when both said start address and said end address correspond to locations within a single cell, dividing said single cell into first, second and third cell portions;

providing said first cell portion with an end address corresponding to said start to create a first new cell;

providing said third cell portion with a start address corresponding to said end address to create a second new cell;

carrying out said user selected editing command upon said second cell portion.

7. An apparatus for editing a program recorded on a digital recording medium comprising:

a menu comprising user selectable editing commands;

a user operable control for providing edit commands to a processing unit;

means for providing a start address and an end address corresponding to a program portion to be edited;

means for modifying video title set information based upon said start address and end address such that at least one editing command is carried out.

8. The apparatus of claim 7 further comprising:

means for portioning an existing call into first, second and third call portions;

said second cell portion comprising said program portion to be edited;

means for providing a first new cell from said first cell portion based upon said start address;

means for providing a third new cell from said third cell portion based upon said end address;

such that said apparatus plays back said program in accordance with a user selected editing command.

* * * * *